United States Patent [19]

Liang

[11] Patent Number: 5,248,882
[45] Date of Patent: Sep. 28, 1993

[54] METHOD AND APPARATUS FOR PROVIDING TAILORED EXCITATION AS IN FOURIER TRANSFORM MASS SPECTROMETRY

[75] Inventor: Zhenmin Liang, Madison, Wis.

[73] Assignee: Extrel FTMS, Inc., Madison, Wis.

[21] Appl. No.: 890,623

[22] Filed: May 28, 1992

[51] Int. Cl.$^5$ .................... B01D 59/44; H01J 49/28
[52] U.S. Cl. ................................... 250/29; 250/282
[58] Field of Search .................... 250/282, 291, 286

[56] References Cited

U.S. PATENT DOCUMENTS

| | | |
|---|---|---|
| 3,461,381 | 8/1969 | Nelson et al. |
| 3,742,212 | 6/1973 | McIver, Jr. |
| 3,937,955 | 2/1976 | Comisarow et al. |
| 4,034,191 | 7/1977 | Tomlinson et al. |
| 4,755,670 | 7/1988 | Syka et al. |
| 4,761,545 | 8/1988 | Marshall et al. |
| 4,818,869 | 4/1989 | Weber-Grabau |
| 4,874,943 | 10/1989 | Specner |
| 4,945,234 | 7/1990 | Goodman et al. |
| 5,013,912 | 5/1991 | Guan et al. |
| 5,047,639 | 9/1991 | Farrar et al. ............ 250/291 |
| 5,171,991 | 12/1992 | Johnson et al. .......... 250/282 |

OTHER PUBLICATIONS

Barrett L. Tomlinson, et al., "Fourier Synthesize Excitation of Nuclear Magnetic Resonance wth Application Homonuclear Decoupling and Solvent Line Suppression," J. Chem. Phys., vol. 59, No. 4, Aug. 15, 1973, pp. 1775-1784.

Alan G. Marshall, et al., "Theory of Fourier Transform Ion Cyclotron Resonance Mass Spectroscopy: Response to Frequency-Sweep Excitation," J. Chem. Phys., vol. 73, No. 4, Aug. 15, 1980, pp. 1581-1590.

Alan G. Marshall, et al., "Ion Cyclotron Resonane Excitation/de-Excitation: A Basis for Stochastic Fourier Transform Ion Cyclotron Mass Spectrometry," Chemical Physics Letters, vol. 105, No. 2, Mar. 9, 1984, pp. 233-236.

Alan G. Marshall, et al., "Fourier Transform Ion Cyclotron Resonance Mass Spectrometry: New Theoretical and Instrumental Developments," A.M.S. meeting, San Antonio, Tex., May 27-Jun. 1, 1984, pp. 600-601.

Alan G. Marshall, et al., "Tailored Excitation for Fourier Transform Ion Cyclotron Resonance Mass Spectrometry," Journal of the American Chemical Society, vol. 107, No. 26, 1985, pp. 7893-7897.

Ling Chen, et al., "Phase-Modulated Stored Waveform Inverse Fourier Transform Excitation for Trapped Ion Mass Spectrometry," Analytical Chemistry, vol. 59, No. 3, Feb. 1, 1987, pp. 449-454.

Shenheng Guan, et al., "Optimal Phase Modulation in Stored Wave Form Inverse Fourier Transform Excitation for Fourier Transform Mass Spectrometry. I. Basic Algorithm," J. Chem. Phys. vol. 92, No. 10, May 15, 1990, pp. 5841-5846.

Tao-Chin Lin Wang, et al., "Extensin of Dynamic Range in Fourier Transform Ion Cyclotron Resonance Mass Spectrometry via Stores Wave Inverse Fourier Transform Excitation," Analytical Chemistry, vol. 58, No. 14, Dec., 1986, pp. 2936-2938.

Evan R. Williams, et al., "Hadamard Transform Measurement of Tandem Fourier-Transform Mass Spectra" Analytical Chemistry, vol. 62, No. 7, Apr. 1, 1990, pp. 699-701.

Shenheng Guan, "Linear Response Theory of Ion Excitation for Fourier Transform Mass Spectrometry," J. Am. Soc. Mass Spectrometry, 1991, vol. 2, pp. 483-486.

*Primary Examiner*—Bruce C. Anderson
*Attorney, Agent, or Firm*—Foley & Lardner

[57] ABSTRACT

Tailored excitation of ions in a mass spectrometer is obtained by using an excitation signal which comprises at least one signal having the form of a sinc function modulated sine wave. The sinc modulated sine wave has a magnitude function in the frequency domain in the form of a rectangular function centered at the frequency of the sine wave and having a width determined by the width of the sinc function. Plural sinc modulated sine wave signals can be applied to the ion trap of the spectrometer, with the various signals having different sine wave frequencies, to provide a tailored excitation spectrum without the need for extended computation.

44 Claims, 10 Drawing Sheets

WAVEFORM TO EXCITE 4 FREQ. BANDS

MAGNITUDE SPECTRUM

WAVEFORM FROM 10 MODULATED SINWAVES

MAGNITUDE SPECTRUM OF THE TOP WAVEFORM

WAVEFORM TO SELECT EXCITE 55, 57, 86 IN H

MAGNITUDE SPECTRUM

NORMAL SPECTRUM OF HEXANE

SELECTIVE ION MONITORING OF m/z 55, 57, 86

1

METHOD AND APPARATUS FOR PROVIDING TAILORED EXCITATION AS IN FOURIER TRANSFORM MASS SPECTROMETRY

FIELD OF THE INVENTION

This invention pertains generally to the field of electric field excitation which may be used in ion mass spectrometry.

BACKGROUND ART

An ion cyclotron uses a magnetic field to deflect an ion moving at some velocity through the field. For a spatially uniform magnetic field having a flux density B, a moving ion of mass m and charge q will be bent into a circular path in a plane perpendicular to the magnetic field at an angular frequency $\omega_0$ in accordance with $\omega_0 = qB/m$. Thus, if the magnetic field strength is known, by measuring the ion cyclotron frequency it is possible in principle to determine the ionic mass-to-charge ratio m/q. In effect, the static magnetic field converts ionic mass into a frequency analog. Because the cyclotron frequencies for singly charged ions ($12 \leq m/q \leq 5,000$) in a magnetic field of about 3 Tesla span a radio-frequency range ($10 \text{ KHz} \leq f \leq 4 \text{ MHz}$) within which frequency can be measured with high precision, the ion cyclotron is potentially capable of offering extremely high mass resolution and accuracy.

Fourier transform techniques have been utilized in the detection scheme of ion resonance in mass spectrometry. In such techniques, the whole spectrum of ions is excited at once and the whole spectrum is thereafter detected at once. Such Fourier transform ion cyclotron resonance spectroscopy techniques are described further in U.S. Pat. No. 3,937,955 to Comisarow, et al., the disclosure of which is incorporated herein by reference. The Comisarow, et al. patent describes a so-called sweep or chirp excitation in which the excitation sinusoid is swept from one frequency to another to excite all ions whose cyclotron frequencies are in that range. Because this is a frequency modulated signal, the shape of its amplitude spectrum is not available as a convenient closed-form equation. The spectral shape is generally a single band with relatively uniform amplitude at the band's center, amplitude ripples which are worse at the band edges, and a gradual decrease in ripple amplitude towards zero outside the band. Both the intensity and location of the ripples as well as the sharpness of the band edges depend on the sweep parameters (sweep rate, start and stop frequencies) in such a manner that arbitrarily sharp band edges and a low ripple cannot be achieved at the same time. In addition, sweep excitation necessarily excites all ions with resonant frequencies between the sweep start and stop frequencies (with broad band sweep) and thereby does not allow selective excitation of ions with only certain ranges of mass-to-charge ratios (hereafter denoted m/z). Such broad band excitations also cannot be used to eject ions selectively of all but one or a few selected m/z values.

A simpler excitation technique is a burst excite, in which a fixed frequency, fixed amplitude sinusoidal signal is applied to the cell excitation plate for a fixed time. This excitation signal has a (sin x)/x shape (a sinc function) in its frequency domain magnitude spectrum. It is possible, by using burst excite, to excite ions of one m/z to a desired orbital radius while not exciting at all ions of a second m/z. However, the only adjustable parameters are the sinusoidal frequency, amplitude, and duration, so that the excite amplitude spectrum can only have a (sin x)/x shape, which is not suitable when ions of many m/z are present.

Another ion excitation method for Fourier transform ion cyclotron mass spectrometry is based on sinusoidal bursts and may be denoted pulse sequence excitation. The sequence of sinusoidal bursts is constructed with the frequency, phase and starting time of each burst selected such that the amplitude spectrum of the sequence approximates the desired excite amplitude spectrum. High selectivity is possible for simple spectral shapes, but it is difficult to construct pulse sequences to approximate arbitrary excite spectra.

Impulse excitation consists of a single narrow pulse. This method is broadband only, so that no selectivity is possible. Also, very high voltages are required to deliver sufficient energy to the ions due to the short duration of the pulse.

Pseudo-random noise excitation uses a white noise sequence to excite ions over a wide mass range. No selectivity is possible with this method either, but much lower voltages are required than for impulse excitation.

An improved technique for tailoring the excite amplitude spectrum to excite ions of particular m/z values is set forth in U.S. Pat. No. 4,761,545 to Marshall, et al., the disclosure of which is incorporated herein by reference. In the method of that patent, which may be denoted as stored waveform inverse Fourier transform excitation, an arbitrary selected excitation amplitude spectrum is inverse Fourier transformed to give a time domain waveform. That waveform is then used as the excitation signal. One difficulty with the procedure is that the resulting time domain waveform can have a very high peak to average power ratio, particularly when the excite amplitude spectrum is broadband. Another difficulty is that if there exist any discontinuities in the starting excite spectrum or in any order derivative of this spectrum, truncating the resulting time domain waveform to finite length introduces Gibbs oscillations into the corresponding excite amplitude spectrum. A window function having a value of zero at both ends can remove the Gibbs oscillation but can cause distortion of a stored waveform which has been phase scrambled. An extension of the stored waveform excitation technique is described in U.S. Pat. No. 4,945,234 to Goodman, et al., the disclosure of which is incorporated herein by reference. That patent provides a technique for providing an excitation signal starting with a frequency domain spectrum and operating on it in such a manner to reduce the Gibbs oscillations of the excitation signal. While such techniques are useful and have been utilized to provide highly tailored excitation spectra, considerable computer processing is required to create the ultimate time domain excitation signal from the initial frequency domain spectrum.

SUMMARY OF THE INVENTION

In the present invention, tailored excitation of ions in a mass spectrometer trap is obtained by utilizing a selected time domain signal which achieves a known frequency domain spectrum. The frequency domain spectrum corresponds to a mass domain spectrum in the ion trap in a constant magnetic field. A tailored excitation spectrum can be achieved utilizing the known time domain excitation signals without the need to inverse Fourier transform a frequency domain spectrum, thereby reducing the computational time required to produce the tailored excitation signal and allowing computations to be performed substantially in "real time". The frequency spectrum of the excitation signal can be tailored to provide narrow or broadband excitation, excitation of multiple separated bands, sharply defined excitation of narrow bands, sharply defined notches between excitation frequencies where ions in the notches are not excited, and arbitrary profiles formed of multiple adjacent bands of selected heights.

In accordance with the present invention, a preferred excitation time domain signal has the form of a sinc function modulating a sine function. The modulation, or multiplication, of these two time domain signals corresponds to the convolution in the frequency domain of the Fourier transform of the two signals. The convolution of the Fourier transforms of the two signals is a rectangular or "boxcar" function centered on the frequency of the sine wave. The width of the excitation spectrum in the frequency domain is specified by the width of the sinc function. An exemplary excitation signal $E(t)$ is $\text{sinc}[2\pi W(t-t_0)]\cdot(\sin 2\pi ft)$. Such a time domain function has a frequency domain magnitude function comprising a rectangular band centered at the frequency f and having a bandwidth 2W. The time $t_0$ is a selected center time for the application of the time domain signal to the excitation plates of the ion cell. Several such signals may be added together to excite multiple bands, with the band frequencies and widths preferably chosen so that the bands do not overlap one another. Any number of such functions may be added together to achieve a desired tailored excitation spectrum comprising a series of rectangular functions of varying widths and center frequencies without having to inverse Fourier transform a frequency domain signal to a time domain signal. Consequently, the time of computation to produce these functions is greatly reduced.

In the mass spectrometry apparatus of the present invention, the sinc and sine functions are preferably stored in memory, are given the desired parameters of W, f, and $t_0$, and are multiplied together to provide a digital signal to a digital-to-analog converter the output of which is amplified and applied to the excitation amplifiers of the ion trap, such as an ICR cell. Several such sinc modulated sine wave signals, which achieve the desired multiple bands in the frequency domain, may be added together in digital form before the final digital signal is provided to the digital-to-analog converter.

Where multiple time domain excitation signals are utilized to achieve multiple bands in the frequency spectrum of the excitation signal, the available dynamic range of the excitation amplifiers can be accommodated by utilizing different $t_0$ times for each of the various excitation signals corresponding to different bands in the frequency spectrum. In this manner, the maximum magnitude of the time domain signals for each band, which occurs at the $t_0$ times, will not be added together.

Real-time tailored excitation can be readily achieved by using multiple channel sine wave accumulators. Each accumulator channel can produce a sine wave of any frequency which can then be modulated by a sinc function. These functions can be applied to the ion cell either directly or by utilizing heterodyne modulation.

The present invention allows an excitation signal to be formed which corresponds to virtually any desired mass domain profile by combining together multiple components of appropriately selected frequencies, widths, and magnitudes.

Further objects, features and advantages of the invention will be apparent from the following detailed description when taken in conjunction with the accompanying drawings.

DETAILED DESCRIPTION OF THE INVENTION

Figure 1:
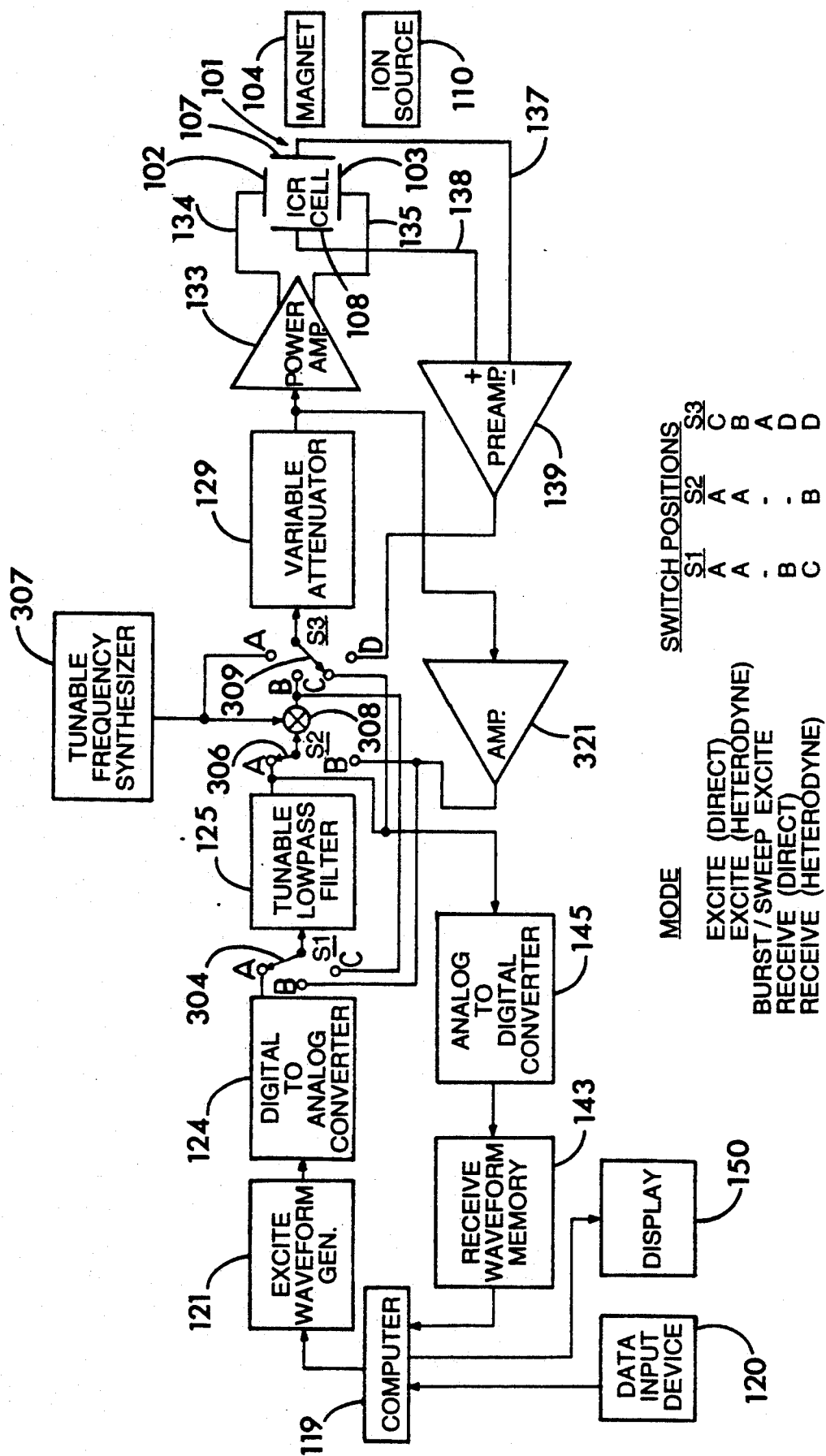
FIG. 1 is a block diagram of an ion cyclotron resonance mass spectrometer system incorporating the present invention.

With reference to the drawings, a schematic block diagram of an ion cyclotron resonance mass spectrometer system which can incorporate the present invention is shown in FIG. 1. The system includes an ion cyclotron resonance (ICR) trap or cell 101. As used herein, the term ion trap includes an ICR cell as well as other types of ion traps. The structure of such cells is well known in the art, and in general such cells are enclosed in an evacuable chamber with a vacuum pump and other ancillary equipment utilized to achieve the desired low pressure in the cell. A magnet 104, typically a superconducting solenoid, produces the magnetic field inside the ICR cell and is well known and shown only schematically in FIG. 1. For purposes of illustration, the ICR trap cell 101 is shown as having a substantially rectangular cross-section with opposed side plates 102 and 103, serving as excitation electrodes, and top and bottom plates 107 and 108 which may serve as detector electrodes. End trapping plates conventionally used in ICR cells are not shown in FIG. 1. A variety of geometric configurations for ICR cells are well known. The magnet typically produces a substantially constant unidirectional magnetic field through the ICR cell such that the electric field from potentials applied to the excitation electrodes is transverse to the applied magnetic field. Various ion source means 110 for introducing ions in the cell 101 are well known and may be used, including sources which generate ions in the cell or sources which generate ions outside the cell with subsequent transport into the cell.

In the illustrative ICR mass spectrometer system of FIG. 1, a data input device 120, e.g., a keyboard, mouse, interactive graphics unit, or a magnetic media reader, receives data from the operator indicating the parameters of the selected time domain excitation signal which will give the user the desired mass domain excitation profile, as discussed below. The data received by the data input device 120 is provided to a programmable digital computer 119. The computer 119 controls an excite waveform generator 121 which, as described below, may incorporate specialized hardware for generating multiple time domain waveforms in real time. Under the control of the computer 119, the digital signal data from the generator 121 is read out to a digital-to-analog converter 124 which provides an analog output signal to a tunable low pass filter 125 which filters out frequencies in the analog signal which are above the frequencies of interest. The filter 125 thus functions as an output anti-aliasing filter. The system can also operate in a heterodyne mode in which the filter 125 would reject only frequencies above the excitation signal bandwidth (for example, 100 KHz). In the direct mode, a switch 306 is set in position A in FIG. 1 and a switch 309 is set in the position C in FIG. 1 such that the output of the filter 125 directly connects to a variable attenuator 129 which is preferably programmable to attenuate the signal by up to 64 dB in 0.1 dB steps. Alternatively, the system can operate in the heterodyne mode in which a high frequency carrier signal is provided from a tunable frequency synthesizer 307, which is under the control of the computer 119, to a mixer 308, and with the switch 309 switched to the position B in FIG. 1 to provide the output signal from the mixer 308 to the variable attenuator 129. The output of the mixer contains a double side-band amplitude modulated signal centered on the output frequency of the tunable frequency synthesizer 307. The output of the attenuator 129 is supplied to a power amplifier 133 which delivers a time varying voltage output signal on the lines 134 and 135 to the excitation electrodes 102 and 103, respectively, with the signals on the lines 134 and 135 being 180° out of phase with one another. The time varying voltage applied to the plates 102 and 103 produces a corresponding time varying electric field in the ICR cell which is oriented transverse to the applied magnetic field.

The tunable frequency synthesizer 307 may function in both the excite and receive modes. The switches 304($S_1$), 306($S_2$), and 309($S_3$) are set to the various positions shown in FIG. 1 depending on the excitation or receive mode. The received signal on the plates 107 and 108 is provided on lines 137 and 138 to a preamplifier 139 and through variable attenuator 129, an amplifier 321, and the switches to an analog-to-digital converter 145 and to a receive waveform memory 143 before being provided back to the computer 119. The output of the system as analyzed by the computer is displayed to the operator on the display unit 150.

The foregoing general structure of an ICR mass spectrometer is well known and described, for example, in the aforesaid U.S. Pat. Nos. 4,945,234 and 4,761,545, which are incorporated herein by reference. The present invention utilizes structure similar to that used with the stored waveform inverse Fourier transform techniques described in these patents, but does not require the creation of a frequency domain spectrum (based on the desired mass domain excitation profile) which is then inverse Fourier transformed. The basis of the present invention is explained below.

The Fourier transforms of two time domain functions A and B may be expressed as FT(A) and FT(B). The Fourier transform of the product of the two time domain functions A and B is equal to the convolution of the Fourier transform of A and the Fourier transform of B, which may be expressed as:

$$FT(A \cdot B) = FT(A) * FT(B),$$

where · represents multiplication and * represents convolution.

In carrying out tailored excitation for Fourier transform ICR mass spectrometry, it is often desired to have a rectangular or "boxcar" function in the frequency spectrum of the excitation signal, or multiple well-defined boxcar functions. It can be shown that the modulation (multiplication) of a pure sine wave function by a sinc function in the time domain corresponds to a convolution of the Fourier transforms of these signals in the frequency domain that produces a rectangular or boxcar function. The center of the rectangular band is at the frequency of the sine wave, and the width of the rectangular band is a function of the width of the sinc function.

A time domain sinc function B can be expressed as:

$$B = [\sin 2\pi W(t - t_0)] / 2\pi W(t - t_0),$$

in which t is the time variable, $t_0$ is the time at which the sinc function has a maximum value (the "center time"), and W is half the desired width of the boxcar function (the bandwidth) of the rectangular magnitude band desired from the excitation signal. Multiplication of the sine wave function A, e.g, $A = \sin 2\pi ft$, by the sinc function B, results in a sinc modulated sine wave excitation signal E(t). The signal E(t) can be expressed as $$E(t) = M \frac{\sin 2\pi W(t - t_0)}{2\pi W(t - t_0)} \cdot \sin 2\pi ft,$$

where M is magnitude constant determined by the amplifiers and other components of the excitation system.

Figure 3:
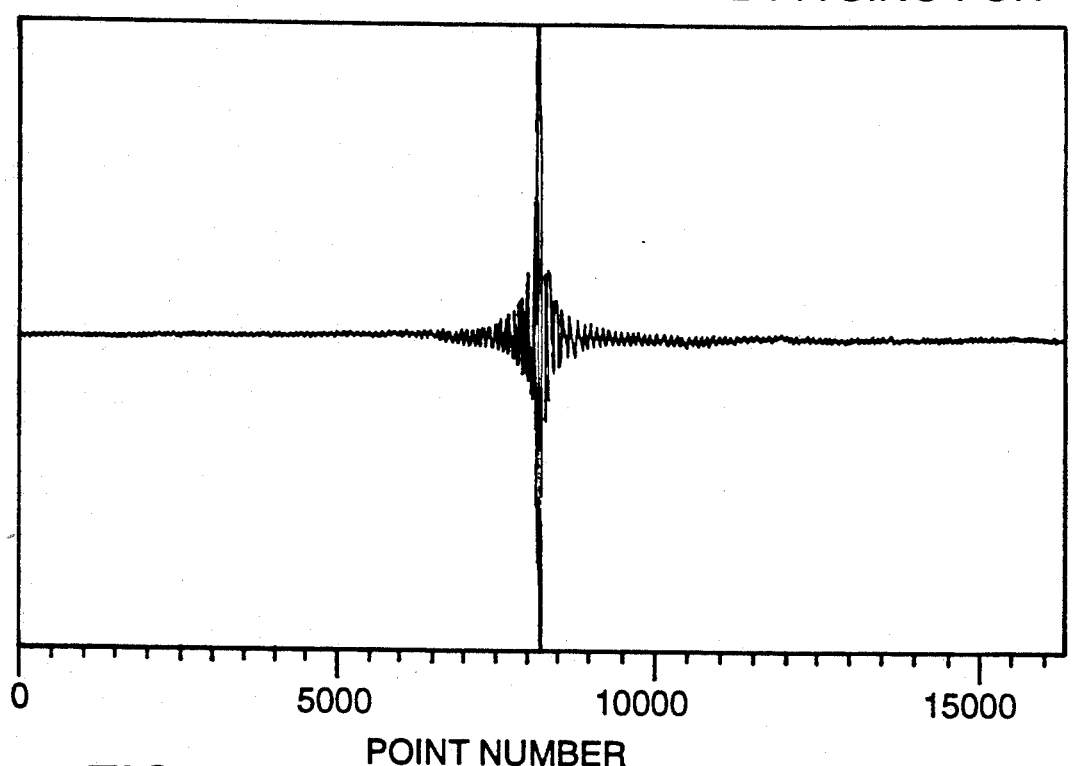
FIG. 3 is a time domain plot of a signal formed of a 500 KHz sine wave modulated by a sinc function.
Figure 4:
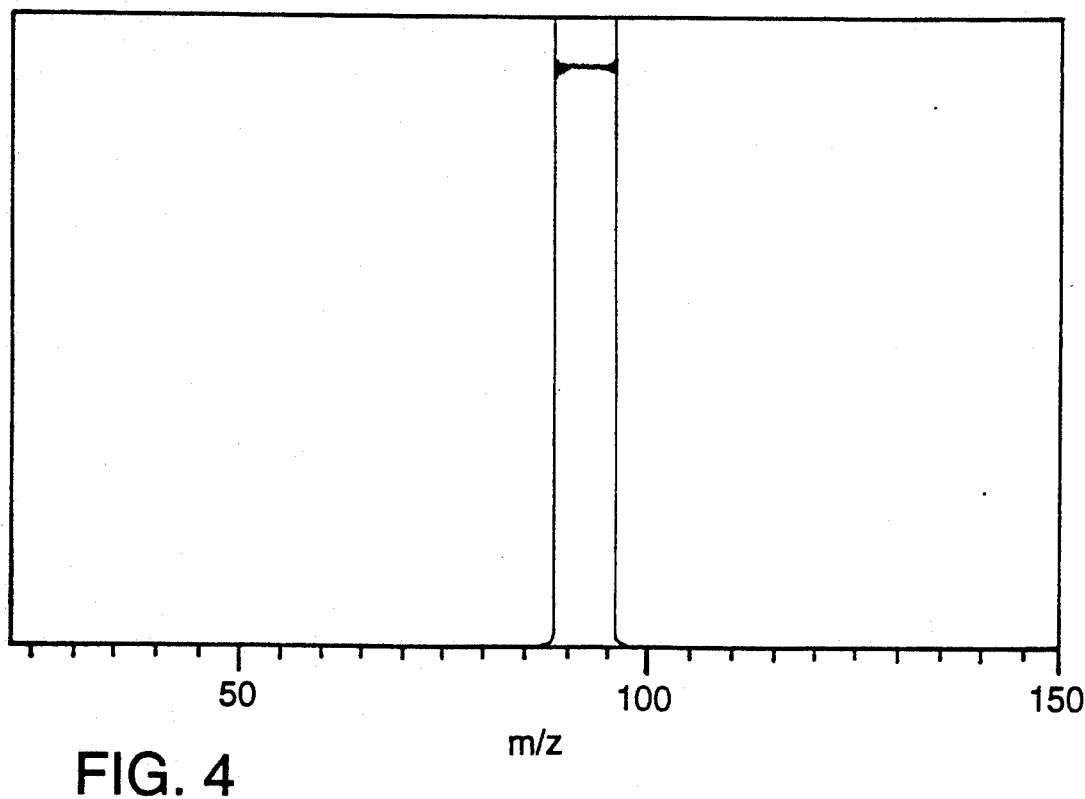
FIG. 4 is the magnitude spectrum in the mass domain for a 3 Tesla (3T) field of the signal of FIG. 3.

The magnitude spectrum of the sinc modulated sine wave signal E(t) is a boxcar function centered at the frequency f and spanning a bandwidth of ±W. An exemplary time domain plot of a 500 KHz sine wave signal modulated by a sinc signal is shown in FIG. 3, and its mass domain magnitude spectrum, corresponding to a magnetic field of 3 Tesla is shown in FIG. 4.

Figure 5:
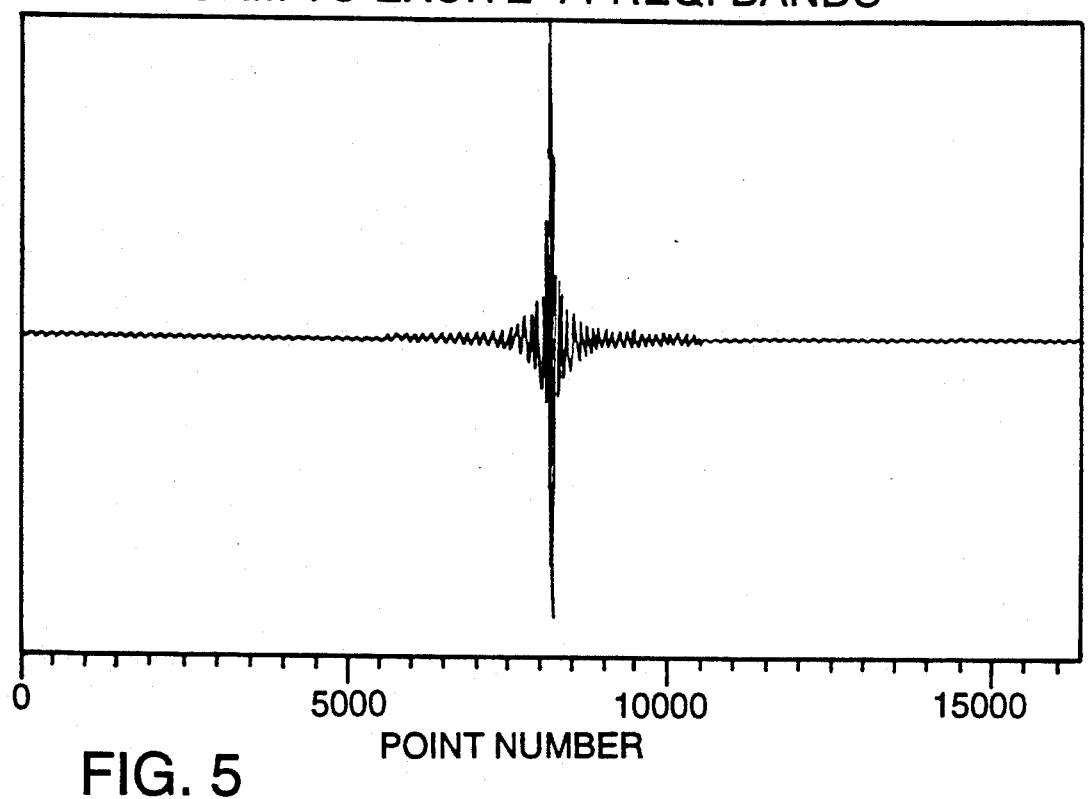
FIG. 5 is a plot of the waveform of a time domain signal for exciting four separated frequency bands.
Figure 6:
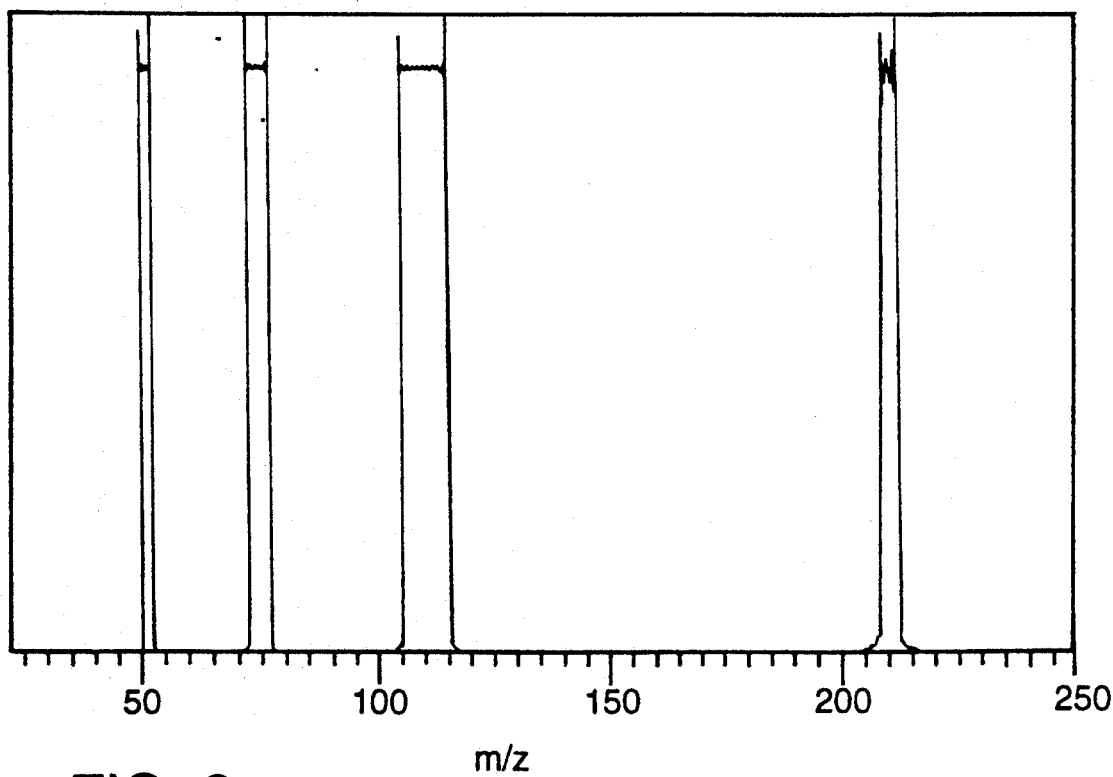
FIG. 6 is a magnitude spectrum in the mass domain at 3T of the time domain signal of FIG. 5.

Several sinc modulated sine waves having different frequencies f and widths W can be added to form a composite excitation waveform. The magnitude spectrum of the waveform is equivalent to the sum of each individual rectangular band from each modulated sine wave, as long as the rectangular bands do not overlap each other. The multiple band excitation signal, having a selected number n signals added together and thus n bands, may be expressed $$E(t) = M_1 \frac{\sin 2\pi W_1(t - t_{01})}{2\pi W_1(t - t_{01})} \cdot \sin 2\pi f_1 t +$$
$$M_2 \frac{\sin 2\pi W_2(t - t_{02})}{2\pi W_2(t - t_{02})} \cdot \sin 2\pi f_2 t + \ldots +$$
$$M_n \frac{\sin 2\pi W_n(t - t_{on})}{2\pi W_n(t - t_{on})} \cdot \sin 2\pi f_n t$$

where the widths $W_1, W_2, \ldots, W_n$, the center times $t_{01}, t_{02}, \ldots t_{on}$, the sine wave frequencies $f_1, f_2, \ldots, f_n$, and the component magnitudes $M_1, M_2, \ldots, M_n$ (related to the excitation radii in FT/ICR for ions resonant at corresponding frequencies) are the excitation signal parameters selected by the user to provide the desired excitation signal spectrum. These parameters can be selected as desired by the user for particular applications. For example, in some cases all the widths $W_1 \ldots W_n$ may be the same and a single sinc function generator may be used. The selected number n of bands may be two or more. FIG. 5 shows a time domain waveform of a signal for exciting four frequency bands, and FIG. 6 is the mass domain plot of the magnitude spectrum of the signal of FIG. 5. In such a way, an excitation signal having arbitrary multiple rectangular magnitude bands in the frequency domain can be obtained so as to correspond to a desired mass domain excitation profile.

Figure 2:
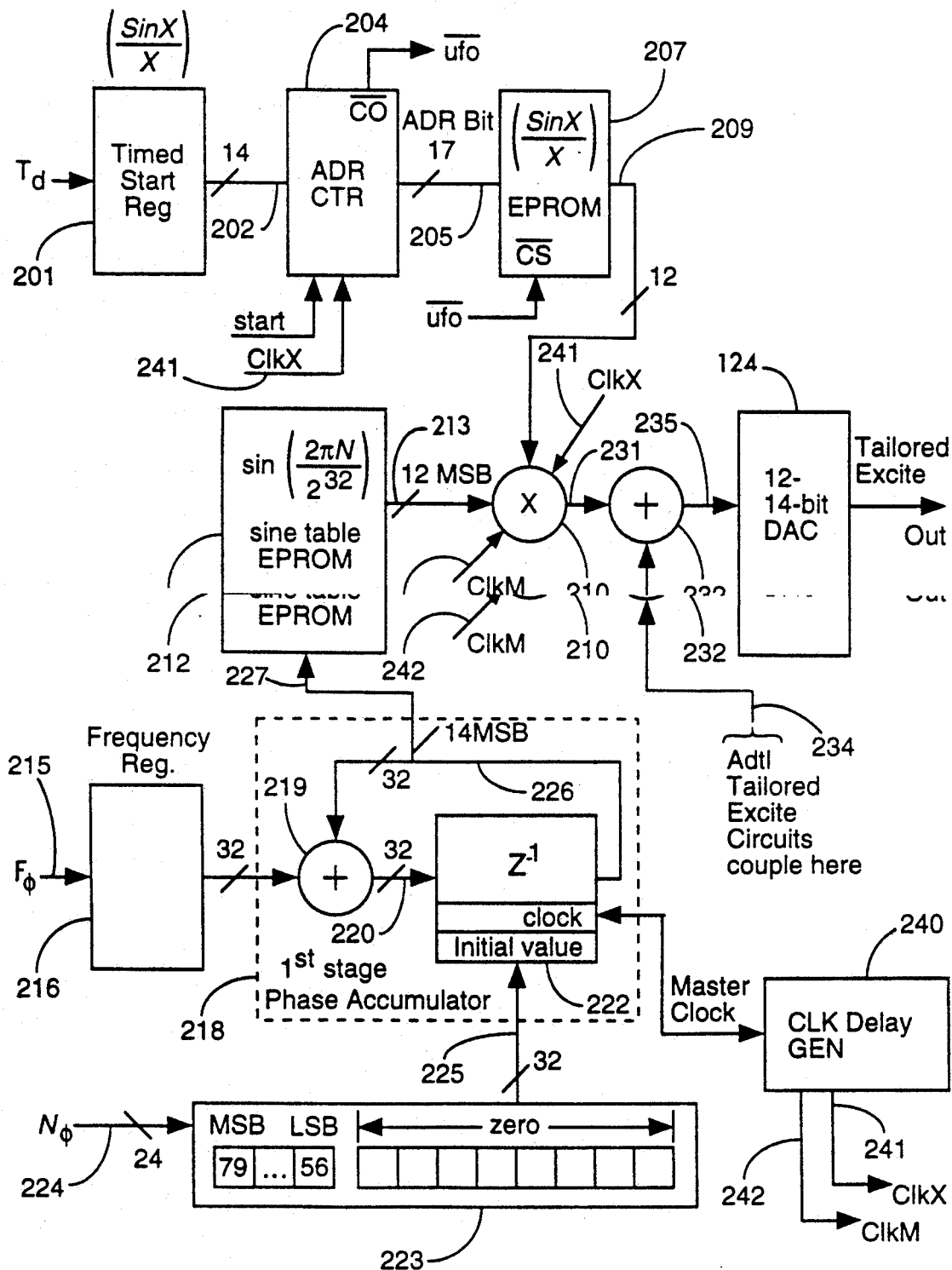
FIG. 2 is a block diagram of the tailored excitation generator for the system of FIG. 1.

A schematic of an exemplary waveform generator 121 of the present invention is shown in FIG. 2. The generator of FIG. 2 may particularly be utilized to output waveforms which are rapidly constructed with minimal computational delay. In this illustrative embodiment, a timed start register 201 is provided by the computer 119 with the starting time $T_d$ for the sinc function (thereby determining the center time of the sinc function), and the register provides its multiple bit output data on lines 202 to an address counter 204. The appropriate phase adjustment delays for sinc function generation, to give maximally flat response to boxcar or bandpass functions, can be determined once by trial and error and used consistently thereafter. The address counter receives a start signal from the computer and a clock signal ClkX, and puts out a multibit signal on lines 205 which are provided to the address inputs of a digital memory 207 (e.g., an EPROM) which is programmed with the sinc function. The time base for the read-out of the sinc function is determined by the output of a clock delay generator 240 which receives a master clock input (e.g., 16 MHz) and puts out the ClkX clock signal along a line 241 and a second clock signal ClkM on a line 242. The clock delay generator 240 provides clock delay and phasing to allow higher speed operation of the components 204, 207, 210, 212, and 218. The data output of the EPROM 207 is provided on a data bus 209 to a (digital) multiplier 210.

The selected frequency of the sine wave, $F_\phi$, expressed in radians per master clock cycle, is provided from the computer on lines 215 to a frequency register 216 which provides its multibit output to an adder 219. The output of the adder on a bus 220 is provided to a digital integrator 222. The unit 222 also receives an initial phase input from a register 223 which is provided with multibit $N_\phi$ input data from the computer on lines 224 and provides a multibit output on lines 225 to the unit 222. The initial phase may be chosen to be zero, in which case an initial phase is not required. The output of the unit 222 is provided on multibit data bus lines 226 and is fed back to the adder 219. The foregoing components function as a phase accumulator 218. A selected number of the most significant bits (e.g., 14 MSB) is provided on data lines 227 to the address inputs of a digital memory 212 (e.g., an EPROM) which is programmed with a sine function table. The output of the EPROM 212 on lines 213, a digital sine function of the desired frequency, is provided to the multiplier 210 which also receives the ClkX input on the line 241 and the ClkM signal on the line 242. The multiplier 210 carries out a digital multiplication of the digital sinc and sine signals. The output of the multiplier 210 is provided on output lines 231 to an adder 232 which may receive the output of additional function generator circuits which provide signals on lines 234 corresponding to additional boxcar function(s) in the frequency domain. The output of the adder 232 on lines 235 is provided to the digital-to-analog converter 124 and thence to the driver amplifiers for the ion cell. Alternatively, signals representing additional boxcar functions may be summed together in analog form with the output of the DAC 124. The functional units of FIG. 2 may be implemented in separate hardware units or may be incorporated in the software programming of the computer 119 and utilize digital memory (RAM) as part of the generator 121. Further, one or both of the sine or sinc signals may be generated in analog (continuous) form, and they may be multiplied together as analog signals. Where two or more waveform generators of the form of FIG. 2 are used, a multiplier may be interposed in the lines 213 or 231 to allow scaling of the magnitude of the signal from each generator.

The appropriate excitation signals may also be generated in other manners. For example, the computer 119 may calculate the appropriate sinc modulated sine wave signal data and write that data into a waveform memory acting as the excite waveform generator 121. The data in the memory may then be read out on a real time basis to provide the desired excitation signal. In addition, the excitation signals may be produced in real time by using a programmed digital signal processor (DSP) in the excite waveform generator 121. The DSP can function as one or more sections of the excite waveform generator (e.g., the sinc function circuit) or as essentially all of the functional components of FIG. 2, depending on the required output signal bandwidth. An example of such a DSP is the ADSP-21020 produced by Analog Devices, Inc., or an Intel 2860 incorporated into the Skybolt array processor produced by Sky Computers, Inc.

The present invention allows a large range of tailored excitation spectra to be created. The following are examples of the creation of such spectra. All of these mass spectra were obtained by using an EXTREL 2001 Series mass spectrometer equipped with an EXTREL SWIFT module.

Figure 7:
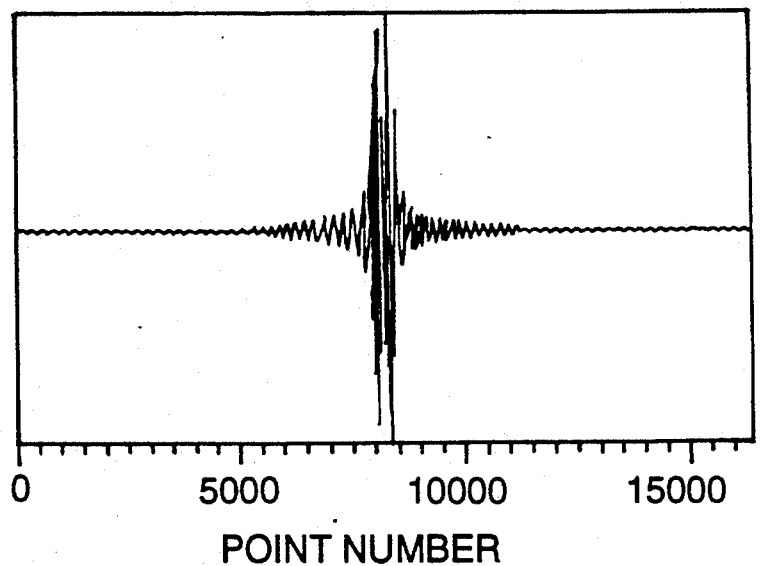
FIG. 7 is a plot of a time domain signal which provides notch ejection of a narrow band of frequencies.
Figure 8:
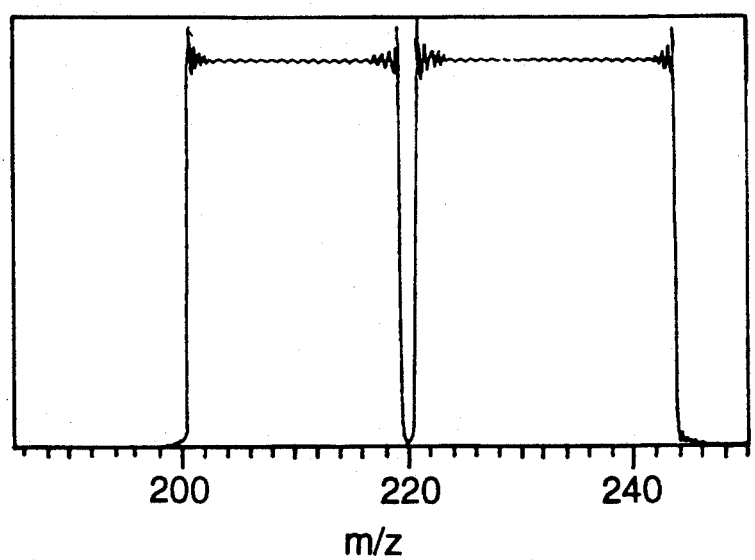
FIG. 8 is a magnitude spectrum in the mass domain at 3T of the signal of FIG. 7.

FIG. 7 shows an excitation signal comprising the sum of two sinc modulated sine waves. The power spectrum of the output signal is shown in FIG. 8. It is seen that the two rectangular functions in the power spectrum resulting from the two sinc modulated sine wave functions are very close to each other but are not overlapping, leaving a narrow notch at an m/z value of 220±0.5.

Figure 9:
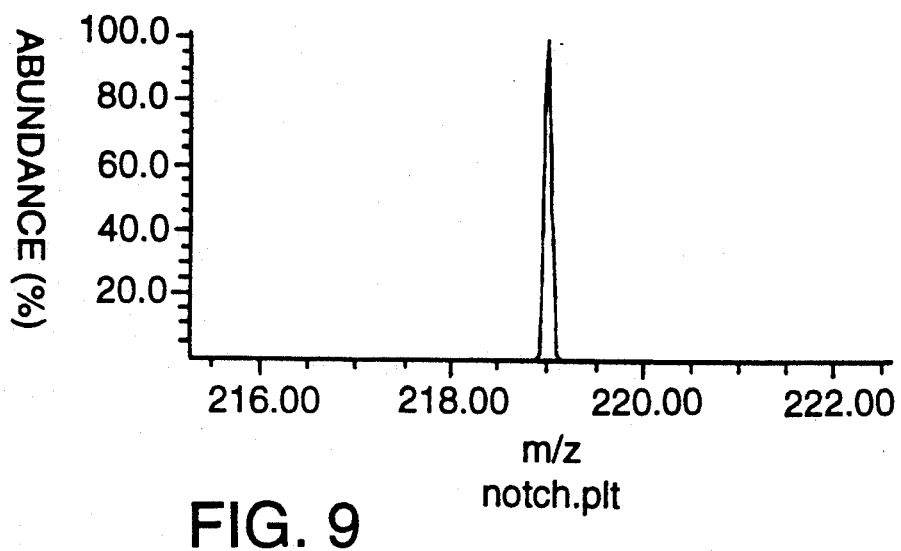
FIG. 9 is an exemplary graph of a mass spectrometry abundance plot without notch ejection showing a dominant peak at about m/z 219 and a minor peak at m/z 220.
Figure 10:
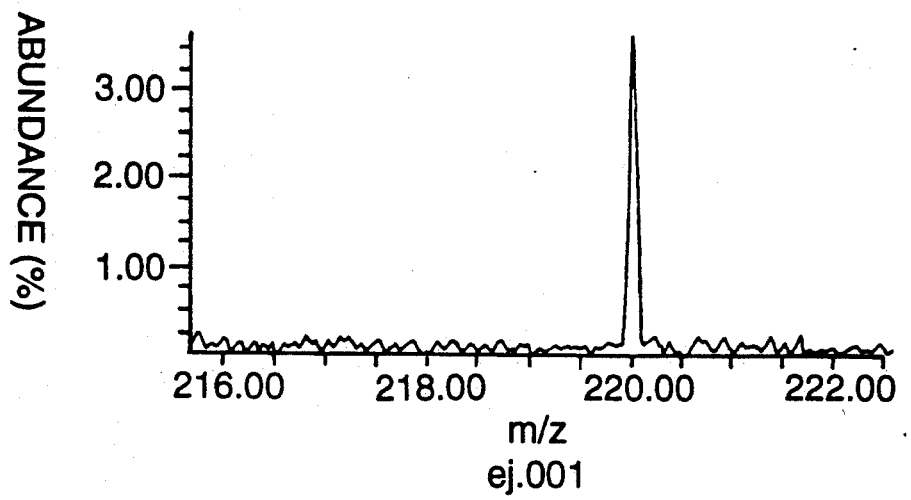
FIG. 10 is a mass spectrometry plot of abundance after utilization of the notch ejection spectrum of FIG. 8 to eliminate ions adjacent to the desired ions at m/z 220.

This excitation signal was utilized in a Fourier transform mass spectrometer and effectively ejected m/z 219 ions in a perfluorotributylamine (PFTBA) sample while leaving m/z 220 ions unexcited. The mass spectrum obtained from the sample without notch ejection by using frequency sweep excitation is shown in FIG. 9 and the spectrum obtained from the sample after notch ejection is shown in FIG. 10.

Because the output of a broadband radio frequency (RF) amplifier is usually limited to a few hundred volts, the maximum value of an excitation waveform must be within the range of the excite amplifier. Where two or more modulated sine functions are simultaneously applied and the excite bandwidth exceeds a certain value, for example, 100 KHz, the excite amplifier may not be capable of satisfying the power requirements. In the stored waveform inverse Fourier transform method, as described, for example, in U.S. Pat. No. 4,761,545, this problem is solved by phase-scrambling the components of the excite signal. In the present invention, the maximum excitation magnitude may be controlled by using different values of the center time of the sinc function, $t_0$, for each modulated sine wave. For example, the computer 119 can control the start signal to the address counter 204 of each generator or load a desired timed start value to the timed start register 201. Because the maximum values of the sinc functions of the several signals do not add together at the same point in time, a reduction in maximum excite signal amplitude is obtained.

Figure 11:
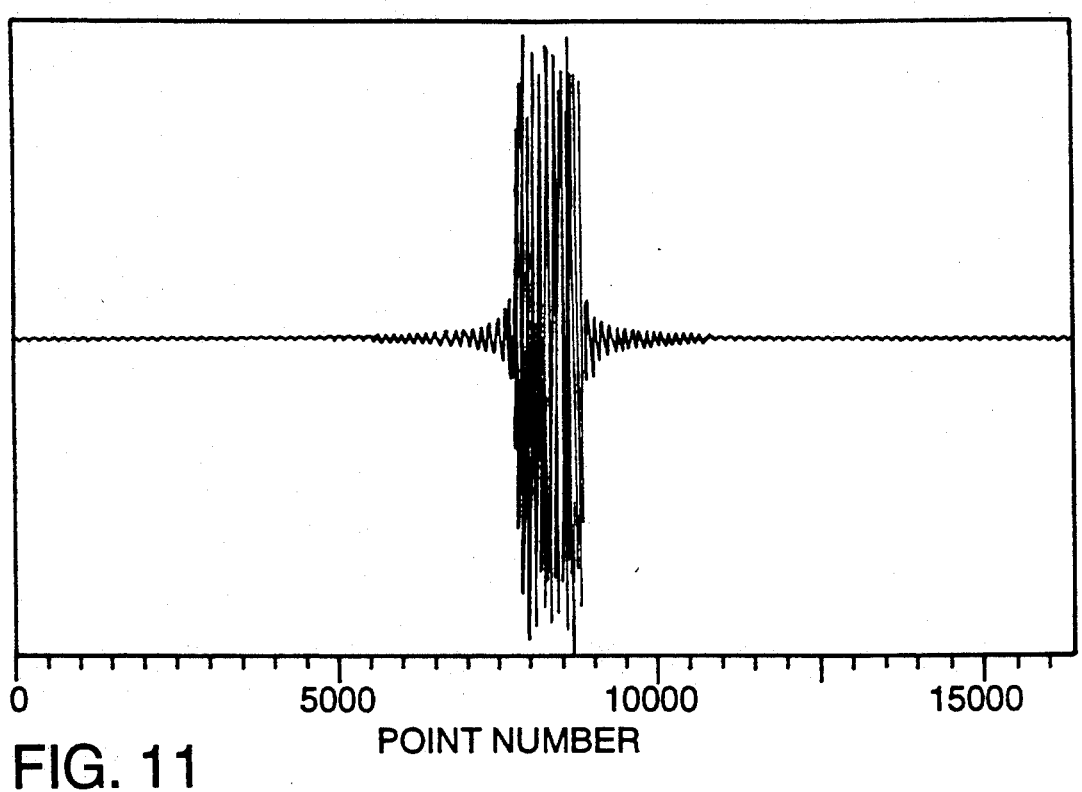
FIG. 11 is a graph of a time domain signal comprised of 10 sinc modulated sine waves added together.
Figure 12:
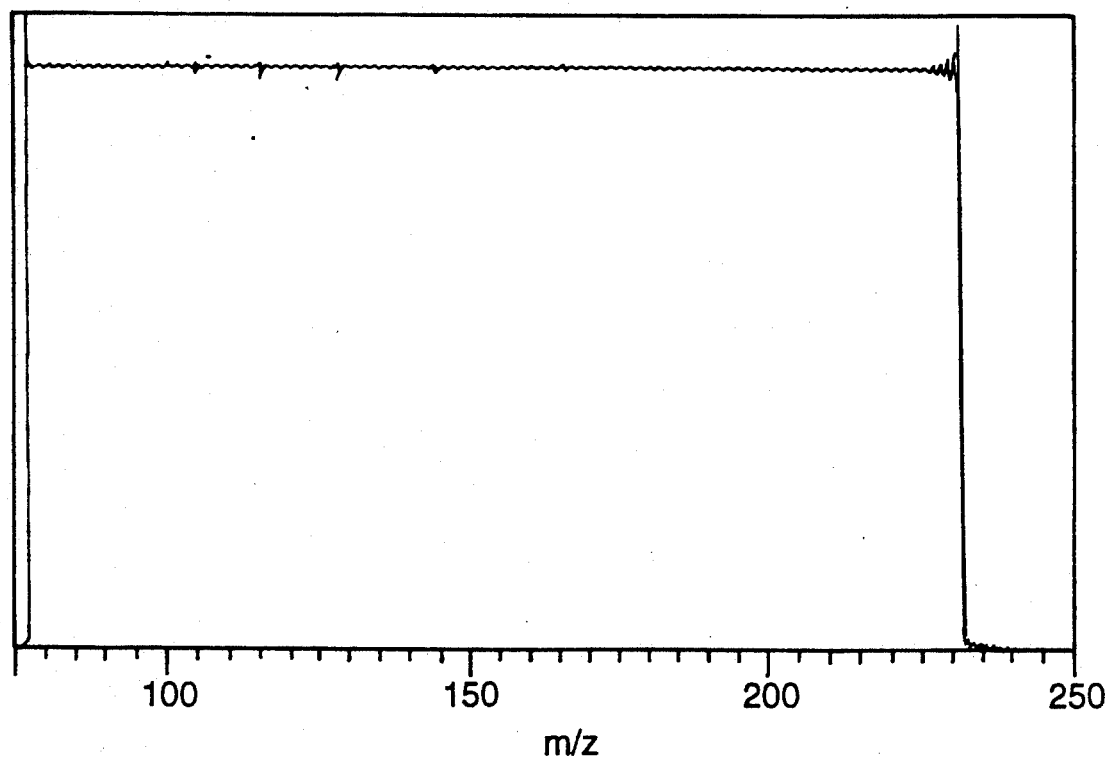
FIG. 12 is the magnitude spectrum in the mass domain at 3T of the waveform of FIG. 11 wherein the mass domain spectra at 3T of the modulated sine waves overlap each other to produce a substantially uniform, wideband excitation spectrum.

For example, if an excitation amplifier provides an excitation field strength of 1200 volts/meter, the adequate excitation bandwidth in a 3 Tesla field is about 50 KHz with a single sinc modulated sine wave. To uniformly excite a 400 KHz bandwidth, a waveform consisting of 10 sinc-modulated sine waves can be used. Each of the 10 modulated sine waves has a 40 KHz wide boxcar or rectangular function spectrum, and the frequencies of the sine waves differ by 40 KHz (or multiples of 40 KHz) from each other, so that the sum of the signals covers the full 400 KHz bandwidth. The $t_0$ times of each sinc function are chosen so that the maximums of the modulated sine waves are spaced from one another by, for example, 30 microseconds, thus avoiding overlap of excitation voltages of the modulated sine waves in large amplitude regions. The resulting excitation signal will effectively excite the entire 400 KHz bandwidth uniformly. Small adjustments of the sinc function maximum positions may be necessary to ensure smooth connections of the rectangular band segments in the spectrum. Various ways are available to determine the delay adjustment. The simplest is by trial and error. Alternatively, the delay can be calculated by using the phases of the two connected edges of the boxcar functions that result in a smooth connection. An example of a signal that excites ions over 400 KHz is shown in FIG. 11 and the mass domain magnitude spectrum for this signal is illustrated in FIG. 12.

Figure 13:
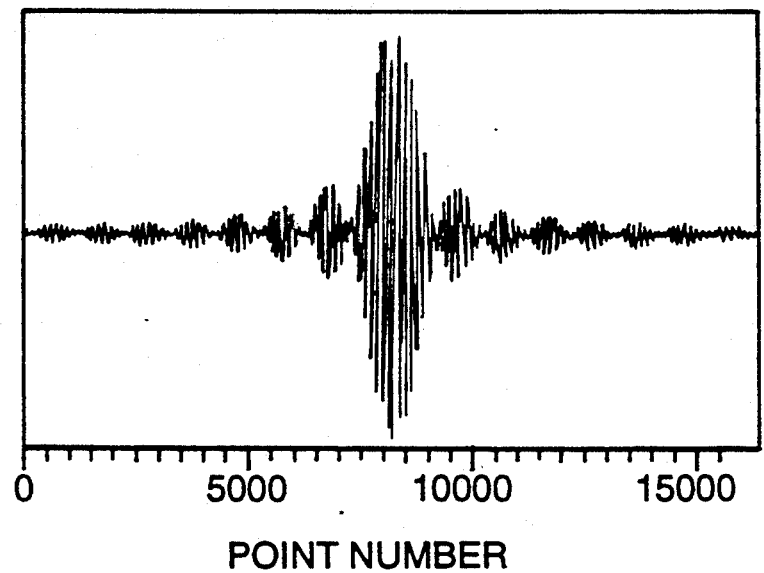
FIG. 13 is a plot of a time domain signal selected to excite three narrow bands.
Figure 14:
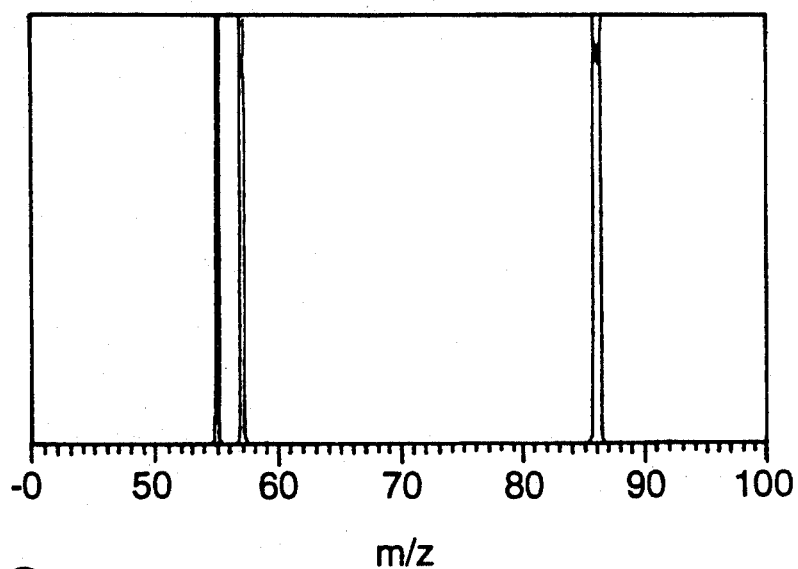
FIG. 14 is a magnitude spectrum in the mass domain at 3T of the time domain signal of FIG. 13.
Figure 15:
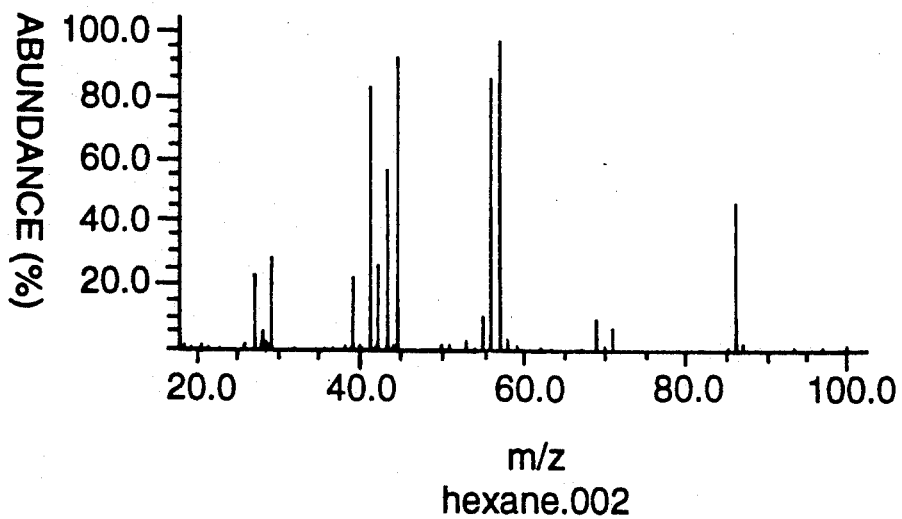
FIG. 15 is a mass spectrum of hexane obtained in a conventional manner.
Figure 16:
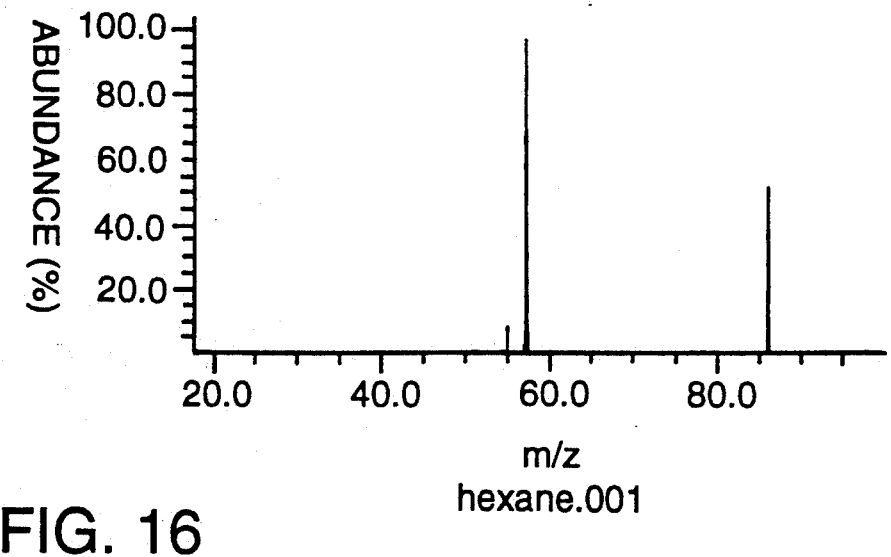
FIG. 16 is a mass spectrum plot at 3T of hexane with the tailored excitation signal of FIG. 13 to selectively excite the ions at m/z 55, 57 and 86.

In many applications, only ions at a few selected m/z values need to be excited or ejected. To achieve selected excitation of this form, several sine waves corresponding to the frequency of the ions may be generated and added. The co-added sine waves may then be multiplied by a broad sinc function, that is, one with full width at half height on the millisecond scale. The dynamic range in such an application is usually not an issue because excitation energy can always be increased by lengthening the width of the sinc function. FIG. 13 illustrates a time domain excitation signal that excites only ions at m/z values of 55, 57 and 86 in a hexane mass spectrum, and FIG. 14 shows the magnitude spectrum in the mass domain at 3T for the signal of FIG. 13. FIG. 15 is a normal spectrum of hexane, and FIG. 16 is a spectrum of hexane obtained with selective ion excitation at m/z 55, 57, 86 by using the excitation signal of FIG. 13.

The modules as described in FIG. 2 can be utilized to obtain effective real-time (i.e., no significant computational delay) tailored excitation in accordance with the invention. Each of several generator channels can provide a modulated sine wave in any desired frequency, and each sine wave can be modulated by a sinc function. The modulated sine waves can then be summed and sent to the excitation amplifier. Each generator can be reloaded or reinitialized by the computer 119 after generation of a signal has been completed so that it is ready to generate a new signal at the command of the computer.

Figure 17:
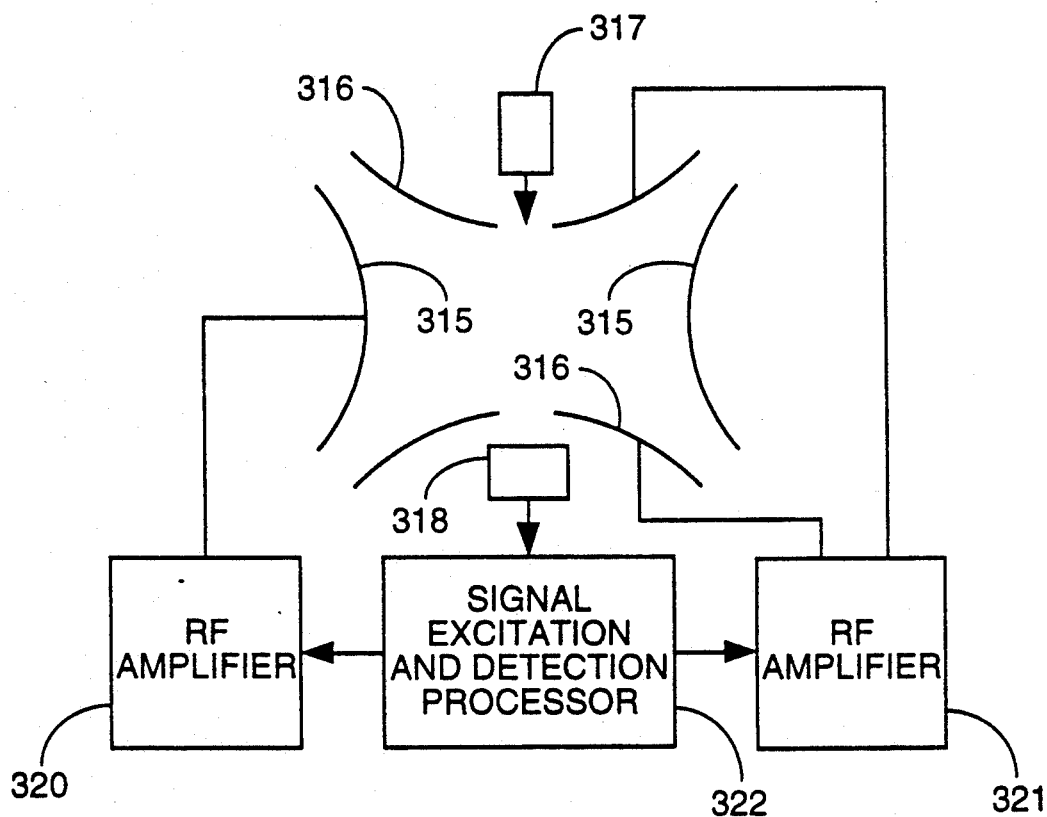
FIG. 17 is a simplified view of an ion trapping system with which the invention may be utilized.

In the present invention, heterodyne mode high resolution tailored excitation may be utilized in the same manner as described in U.S. Pat. No. 4,761,545. Further, the present invention may be utilized in a quadrupole ion trap such as illustrated in FIG. 17. The ion trap of FIG. 17 is illustratively shown as having a ring electrode 315, end cap electrodes 316, an ion generating source 317 such as an electron gun which ionizes a gas in the trap or an external ion source which can inject ions into the trap, and a detector of ejected ions 318. Appropriate trapping voltages are applied to the ring electrode 315 and end caps 316 through a radio frequency amplifier and biasing circuits 320 and 321 to cause trapping of the ions within the plates in a well known manner. The tailored excitation signals of the present invention may then be applied to the end caps 316 by a computer-controlled signal excitation and detection processor 322, in the same manner as the excitation of the plates 102 and 103 of the ICR cell 101 as described above, to achieve tailored excitation and ejection of ions from the ion trap. The ejected ions can be detected by the detector 318 and analyzed by the processor 322 to provide a mass spectrum of the ejected ions. By applying excitation in accordance with the present invention, ejection can be obtained of all masses within an excitation band or ejection of all masses above and below a selected band.

The present invention may also be used in other applications where a frequency domain excitation profile having a particular form is desired, such as in nuclear magnetic resonance (NMR) applications where the radio frequency electrodes act as excitation electrodes.

It is understood that the invention is not confined to the particular embodiments as set forth herein, but embraces such modified forms thereof as come within the scope of the following claims.

What is claimed is:

1. Mass spectrometry apparatus comprising:
   (a) an ion trap including a plurality of electrode plates;
   (b) means for detecting motion of ions in the trap and providing a signal indicative thereof;
   (c) excitation means connected to the ion trap for producing an electric field in the trap, wherein the excitation means generates a sine wave signal at a selected frequency and a sinc function signal of a selected width and center time and multiplies the two signals to provide an excitation signal which is applied to plates of the ion trap, whereby the magnitude spectrum of the excitation signal in the frequency domain is a substantially rectangular function centered on the frequency of the sine wave signal and having a width determined by the width of the sinc function signal.

2. The apparatus of claim 1 wherein the excitation signal E(t) is generated in accordance with the expression:

$$E(t) = \frac{\sin 2\pi W(t - t_0)}{2\pi W(t - t_0)} \cdot \sin 2\pi f t$$

where $t_0$ is the desired center time at the maximum of the sinc function, W is the width of the sinc function, which corresponds to one-half the bandwidth of the rectangular excitation function in the frequency domain, t is time, and f is the frequency of the sine wave.

3. The apparatus of claim 2 wherein the excitation means provides a composite signal which is the sum of plural excitation signals, each excitation signal having a different sine wave frequency f and with the width W of each signal selected so that the bandwidth of the rectangular functions in the frequency domain of each of the individual sinc modulated sine wave signals do not overlap.

4. The apparatus of claim 2 wherein the time $t_0$ of the maximum of each sinc modulated sine wave component of the excitation signal differs from the time of the maximum of all the other components.

5. The apparatus of claim 1 wherein the excitation means generates an excitation signal comprised of the sum of a plurality of excitation signals each comprising a sinc modulated sine wave, each sinc modulated sine wave having a different sine wave frequency and the width of each sinc modulated sine wave being chosen so that the bandwidths of the rectangular functions of each sinc modulated sine wave in the frequency domain do not overlap.

6. The apparatus of claim 1 wherein the excitation means includes means for mixing a first higher frequency carrier signal with a time domain signal and wherein the excitation means produces an electric field in the trap which varies in accordance with the first higher frequency signal modulated by the time domain signal.

7. The apparatus of claim 1 wherein the excitation means includes:

(a) sinc function digital memory storing digital data in locations which can be sequentially read out to provide an output signal wherein the data when read out follows a sinc function;

(b) sine function digital memory storing digital data in locations which can be sequentially read out to provide an output signal wherein the data when read out follows a sine function;

(c) multiplying means for multiplying the output signal of the sinc function digital memory with the output signal of the sine function digital memory to provide a digital output signal;

(d) a digital-to-analog converter connected to receive digital data input from the multiplying means and connected to provide its analog output signal to the ion trap;

(e) means for selectively controlling the output of digital data stored in the sinc function and sine function digital memories to the multiplying means to apply a desired time domain excitation signal to the ion trap.

8. The apparatus of claim 1 wherein the excitation signal E(t) is a composite excitation signal, having a selected number n of signal components, which is generated in accordance with the expression:

$$E(t) = M_1 \frac{\sin 2\pi W_1(t - t_{01})}{2\pi W_1(t - t_{01})} \cdot \sin 2\pi f_1 t + \ldots +$$

$$M_n \frac{\sin 2\pi W_n(t - t_{0n})}{2\pi W_n(t - t_{0n})} \cdot \sin 2\pi f_n t$$

where t is time and the widths $W_1, \ldots, W_n$, the center times $t_{01}, \ldots, t_{0n}$, the sine wave frequencies $f_1, \ldots, f_n$, and the component magnitudes $M_1, \ldots, M_n$ are excitation signal parameters selected by the user.

9. Mass spectrometry apparatus comprising:

(a) an ion trap including a plurality of electrode plates;

(b) means for detecting motion of ions in the trap and providing a signal indicative thereof;

(c) excitation means connected to the ion trap for producing an electric field in the trap, the excitation means including:

(1) sinc function digital memory storing digital data in locations which can be sequentially read out to provide an output signal wherein the data when read out follows a sinc function;

(2) sine function digital memory storing digital data in locations which can be sequentially read out to provide an output signal wherein the data when read out follows a sine function;

(3) multiplying means for multiplying the output signal of the sinc function digital memory with the output signal of the sine function digital memory to provide a digital output signal;

(4) a digital-to-analog converter connected to receive digital data input from the multiplying means and connected to provide its analog output signal to the ion trap;

(5) means for selectively controlling the output of digital data stored in the sinc function and sine function digital memories to the multiplying means to apply a desired time domain excitation signal to the ion trap.

10. The apparatus of claim 9 wherein the excitation signal E(t) is generated in accordance with the expression:

$$E(t) = \frac{\sin 2\pi W(t - t_0)}{2\pi W(t - t_0)} \cdot \sin 2\pi f t$$

where $t_0$ is the desired center time at the maximum of the sinc function, W is the width of the sinc function, which corresponds to one-half the bandwidth of the rectangular excitation function in the frequency domain, t is time, and f is the frequency of the sine wave.

11. The apparatus of claim 10 wherein the excitation means provides a composite signal which is the sum of plural excitation signals, each excitation signal having a different sine wave frequency f and with the width W of each signal selected so that the bandwidth of the rectangular functions in the frequency domain of each of the individual sinc modulated sine wave signals do not overlap.

12. The apparatus of claim 11 wherein the time $t_0$ of the maximum of each sinc modulated sine wave component of the excitation signal differs from the time of the maximum of all the other components.

13. The apparatus of claim 9 wherein the excitation means generates an excitation signal comprised of the sum of a plurality of excitation signals each comprising a sinc modulated sine wave, each sinc modulated sine wave having a different sine wave frequency and the width of each sinc modulated sine wave being chosen so that the bandwidths of the rectangular functions of each sinc modulated sine wave in the frequency domain do not overlap.

14. The apparatus of claim 9 wherein the excitation means includes means for mixing a first higher frequency carrier signal with a time domain signal and wherein the excitation means produces an electric field in the cell which varies in accordance with the first higher frequency signal modulated by the time domain signal.

15. The apparatus of claim 9 wherein the excitation signal E(t) is a composite excitation signal, having a selected number n of signal components, which is generated in accordance with the expression:

$$E(t) = M_1 \frac{\sin 2\pi W_1(t - t_{01})}{2\pi W_1(t - t_{01})} \cdot \sin 2\pi f_1 t + \ldots + M_n \frac{\sin 2\pi W_n(t - t_{0n})}{2\pi W_n(t - t_{0n})} \cdot \sin 2\pi f_n t$$

where t is time and the widths $W_1, \ldots, W_n$, the center times $t_{01}, \ldots, t_0$, the sine wave frequencies $f_1, \ldots, f_n$, and the component magnitudes $M_1, \ldots, M_n$ are excitation signal parameters selected by the user.

16. In an ion cyclotron resonance mass spectrometer apparatus of the type having an ion cyclotron resonance trap cell including excitation plates and detection plates, a magnet producing a substantially constant unidirectional magnetic field through the ion cyclotron resonance cell such that the electric field from potentials applied to the excitation plates is transverse to the applied magnetic field, means connected to the detector plates of the cell for detecting resonance motion of ions in the cell and providing a signal indicative thereof, and an excitation amplifier connected to the excitation plates for applying electrical potentials to the plates to form an electric field between the plates in accordance with the input signal to the excitation amplifier means, the improvement comprising:

excitation generator means connected to the excitation amplifier for providing an excitation signal to the amplifier, wherein the excitation generator generates a sine wave signal at a selected frequency and a sinc function signal of a selected width and center time and multiplies the two signals to provide the excitation signal, whereby the magnitude spectrum of the excitation signal in the frequency domain is a substantially rectangular function centered on the frequency of the sine wave signal and having a width determined by the width of the sinc function signal.

17. The apparatus of claim 16 wherein the excitation signal E(t) is generated in accordance with the expression:

$$E(t) = \frac{\sin 2\pi W(t - t_0)}{2\pi W(t - t_0)} \cdot \sin 2\pi f t$$

where $t_0$ is the desired center time at the maximum of the sinc function, W is the width of the sinc function, which corresponds to one-half the bandwidth of the rectangular excitation function in the frequency domain, t is time, and f is the frequency of the sine wave.

18. The apparatus of claim 17 wherein the excitation means provides a composite signal which is the sum of plural excitation signals, each excitation signal having a different sine wave frequency f and with the width W of each signal selected so that the bandwidth of the rectangular functions in the frequency domain of each of the individual sinc modulated sine wave signals do not overlap.

19. The apparatus of claim 18 wherein the time $t_0$ of the maximum of each sinc modulated sine wave component of the excitation signal differs from the time of the maximum of all the other components.

20. The apparatus of claim 16 wherein the excitation means generates an excitation signal comprised of the sum of a plurality of excitation signals each comprising a sinc modulated sine wave, each sinc modulated sine wave having a different sine wave frequency and the width of each sinc modulated sine wave being chosen so that the bandwidths of the rectangular functions of each sinc modulated sine wave in the frequency domain do not overlap.

21. The apparatus of claim 16 wherein the excitation means includes means for mixing a first higher frequency carrier signal with a time domain signal and wherein the excitation means produces an electric field in the cell which varies in accordance with the first higher frequency signal modulated by the time domain signal.

22. The apparatus of claim 16 wherein the excitation means includes:
(a) sinc function digital memory storing digital data in locations which can be sequentially read out to provide an output signal wherein the data when read out follows a sinc function;
(b) sine function digital memory storing digital data in locations which can be sequentially read out to provide an output signal wherein the data when read out follows a sine function;
(c) multiplying means for multiplying the output signal of the sinc function digital memory with the output signal of the sine function digital memory to provide a digital output signal;
(d) a digital-to-analog converter connected to receive digital data input from the multiplying means and connected to provide its analog output signal to the ion cell;
(e) means for selectively controlling the output of digital data stored in the sinc function and sine function digital memories to the multiplying means to apply a desired time domain excitation signal to the ion cell.

23. The apparatus of claim 16 wherein the excitation signal E(t) is a composite excitation signal, having a selected number n of signal components, which is generated in accordance with the expression:

$$E(t) = M_1 \frac{\sin 2\pi W_1(t - t_{01})}{2\pi W_1(t - t_{01})} \cdot \sin 2\pi f_1 t + \ldots +$$

-continued $$M_n \frac{\sin 2\pi W_n(t - t_{on})}{2\pi W_n(t - t_{on})} \cdot \sin 2\pi f_n t$$

where t is time and the widths $W_1, \ldots, W_n$, the center times $t_{01}, \ldots, t_0$, the sine wave frequencies $f_1, \ldots, f_n$, and the component magnitudes $M_1, \ldots, M_n$ are excitation signal parameters selected by the user.

24. A method of providing tailored excitation to a spectrometer having excitation electrodes, comprising the steps of:
   (a) generating a sine wave signal of a selected frequency;
   (b) generating a sinc function signal of a selected width and center time;
   (c) multiplying the sinc function signal and the sine function signal to provide a time varying excitation signal; and
   (d) applying the excitation signal to the excitation electrodes whereby a time varying excitation field is formed having one or more substantially rectangular components in the frequency domain.

25. The method of claim 24 wherein the excitation signal E(t) is generated in accordance with the expression:

$$E(t) = \frac{\sin 2\pi W(t - t_0)}{2\pi W(t - t_0)} \cdot \sin 2\pi f t$$

where $t_0$ is the desired center time at the maximum of the sinc function, W is the width of the sinc function, which corresponds to one-half the bandwidth of the rectangular excitation function in the frequency domain, t is time, and f is the frequency of the sine wave.

26. The method of claim 25 wherein the excitation signal is a composite signal which is the sum of plural excitation signals, each excitation signal having a different sine wave frequency f and with the width W of each signal selected so that the bandwidth of the rectangular functions in the frequency domain of each of the individual sinc modulated sine wave signals do not overlap.

27. The method of claim 25 wherein the time $t_0$ of the maximum of each sinc modulated sine wave component of the excitation signal differs from the time of the maximum of all of the other components.

28. The method of claim 24 wherein the excitation signal is comprised of the sum of a plurality of excitation signals each comprising a sinc modulated sine wave, each sinc modulated sine wave having a different sine wave frequency and the width of each sinc modulated sine wave being chosen so that the bandwidths of each sinc modulated sine wave in the frequency domain do not overlap.

29. The method of claim 24 wherein the excitation signal E(t) is a composite excitation signal, having a selected number n of signal components, which is generated in accordance with the expression:

$$E(t) = M_1 \frac{\sin 2\pi W_1(t - t_{01})}{2\pi W_1(t - t_{01})} \cdot \sin 2\pi f_1 t + \ldots +$$

$$M_n \frac{\sin 2\pi W_n(t - t_{on})}{2\pi W_n(t - t_{on})} \cdot \sin 2\pi f_n t$$

where t is time and the widths $W_1, \ldots, W_n$, the center times $t_0, \ldots, t_{on}$, the sine wave frequencies $f_1, \ldots, f_n$, and the component magnitudes $M_1, \ldots, M_n$ are excitation signal parameters selected by the user.

30. In an ion trap apparatus of the type having a ring electrode and end electrodes, a source of ions, and means for detecting ions to produce a signal indicative thereof, the improvement comprising:
   excitation means connected to the end electrodes of the trap for producing an electric field in the trap, wherein the excitation means generates a sine wave signal at a selected frequency and a sinc function signal of a selected width and center time and multiplies the two signals to provide an excitation signal which is applied to electrodes of the ion trap, whereby the magnitude spectrum of the excitation signal in the frequency domain is a substantially rectangular function centered on the frequency of the sine wave signal and having a width determined by the width of the sinc function signal.

31. The apparatus of claim 30 wherein the excitation signal E(t) is generated in accordance with the expression:

$$E(t) = \frac{\sin 2\pi W(t - t_0)}{2\pi W(t - t_0)} \cdot \sin 2\pi f t$$

where $t_0$ is the desired center time at the maximum of the sinc function, W is the width of the sinc function, which corresponds to one-half the bandwidth of the rectangular excitation function in the frequency domain, t is time, and f is the frequency of the sine wave.

32. The apparatus of claim 31 wherein the excitation means provides a composite signal which is the sum of plural excitation signals, each excitation signal having a different sine wave frequency f and with the width W of each signal selected so that the bandwidth of the rectangular functions in the frequency domain of each of the individual sinc modulated sine wave signals do not overlap.

33. The apparatus of claim 32 wherein the time $t_0$ of the maximum of each sinc modulated sine wave component of the excitation signal differs from the time of the maximum of all the other components.

34. The apparatus of claim 30 wherein the excitation means generates an excitation signal comprised of the sum of a plurality of excitation signals each comprising a sinc modulated sine wave, each sinc modulated sine wave having a different sine wave frequency and the width of each sinc modulated sine wave being chosen so that the bandwidths of the rectangular functions of each sinc modulated sine wave in the frequency domain do not overlap.

35. The apparatus of claim 30 wherein the excitation means includes means for mixing a first higher frequency carrier signal with a time domain signal and wherein the excitation means produces an electric field in the trap which varies in accordance with the first higher frequency signal modulated by the time domain signal.

36. The apparatus of claim 30 wherein the excitation means includes:
   (a) sinc function digital memory storing digital data in locations which can be sequentially read out to provide an output signal wherein the data when read out follows a sinc function;
   (b) sine function digital memory storing digital data in locations which can be sequentially read out to provide an output signal wherein the data when read out follows a sine function;

(c) multiplying means for multiplying the output signal of the sinc function digital memory with the output signal of the sine function digital memory to provide a digital output signal;

(d) a digital-to-analog converter connected to receive digital data input from the multiplying means and connected to provide its analog output signal to the ion trap;

(e) means for selectively controlling the output of digital data stored in the sinc function and sine function digital memories to the multiplying means to apply a desired time domain excitation signal to the ion trap.

37. The apparatus of claim 36 wherein the excitation signal E(t) is a composite excitation signal, having a selected number n of signal components, which is generated in accordance with the expression:

$$E(t) = M_1 \frac{\sin 2\pi W_1(t - t_{01})}{2\pi W_1(t - t_{01})} \cdot \sin 2\pi f_1 t + \ldots + M_n \frac{\sin 2\pi W_n(t - t_{on})}{2\pi W_n(t - t_{on})} \cdot \sin 2\pi f_n t$$

where t is time and the widths $W_1, \ldots, W_n$, the center times $t_{01}, \ldots, t_{on}$, the sine wave frequencies $f_1, \ldots, f_n$, and the component magnitudes $M_1, \ldots, M_n$ are excitation signal parameters selected by the user.

38. A method of ejecting selected mass-to-charge ratio ions from an ion trap of the type having a ring electrode and end electrodes, comprising the steps of:

(a) generating a sine wave signal at a selected frequency;

(b) generating a sinc function signal having a selected width and center time;

(c) multiplying the sine wave signal times the sinc function signal to provide an output excitation signal; and (d) applying a voltage to the end electrodes of the ion trap to create an electric field in the ion trap which has a time domain waveform which corresponds to the excitation signal waveform to eject ions having mass-to-charge ratios which generally correspond to the frequency of the sine wave signal in the excitation signal.

39. The method of claim 3 wherein the excitation signal E(t) is generated in accordance with the expression:

$$E(t) = \frac{\sin 2\pi W(t - t_0)}{2\pi W(t - t_0)} \cdot \sin 2\pi f t$$

where $t_0$ is the desired center time at the maximum of the sinc function, W is the width of the sinc function, which corresponds to one-half the bandwidth of the rectangular excitation function in the frequency domain, t is time, and f is the frequency of the sine wave.

40. The method of claim 39 wherein the excitation signal is a composite signal which is the sum of the plural excitation signals, each excitation signal having a different sine wave frequency f and with the width W of each signal selected so that the bandwidth of the rectangular functions in the frequency domain of each of the individual sinc modulated sine wave signals do not overlap.

41. The method of claim 40 wherein the time $t_0$ of the maximum of each sinc modulated sine wave component of the excitation signal differs from the time of the maximum of all of the other components.

42. The method of claim 38 wherein the excitation signal is comprised of the sum of a plurality of excitation signals each comprising a sinc modulated sine wave, each sinc modulated sine wave having a different sine wave frequency and the width of each sinc modulated sine wave being chosen so that the bandwidths of each sinc modulated sine wave in the frequency domain do not overlap.

43. The method of claim 38 wherein the excitation signal E(t) is a composite excitation signal, having a selected number N of signal components, which is generated in accordance with the expression:

$$E(t) = M_1 \frac{\sin 2\pi W_1(t - t_{01})}{2\pi W_1(t - t_{01})} \cdot \sin 2\pi f_1 t + \ldots + M_n \frac{\sin 2\pi W_n(t - t_{on})}{2\pi W_n(t - t_{on})} \cdot \sin 2\pi f_n t$$

where t is time and the widths $W_1, \ldots, W_n$, the center times $t_{01}, \ldots, t_{on}$, the sine wave frequencies $f_1, \ldots, f_n$, and the component magnitudes $M_1, \ldots, M_n$ are excitation signal parameters selected by the user.

44. A method of obtaining mass spectra from a mass spectrometer having an ion trap, comprising the steps of:

(a) generating a sine wave signal at a selected frequency and a sinc function signal having a selected width and center time and multiplying the two signals to provide an excitation signal, whereby the magnitude spectrum of the excitation signal in the frequency domain is a substantially rectangular function centered on the frequency of the sine wave signal and having a width determined by the width of the sinc function signal;

(b) applying an electric field to the ion trap which has a time domain waveform which corresponds to the excitation signal at a power level to eject ions having mass to charge ratios near the frequency of the sine wave signal; and (c) thereafter applying a broad band excitation to the ion trap to acquire a mass spectrum containing peaks corresponding to the ions remaining in the trap.

* * * * *

UNITED STATES PATENT AND TRADEMARK OFFICE
CERTIFICATE OF CORRECTION

PATENT NO. : 5,248,882

Page 1 of 2

DATED : September 28, 1993

INVENTOR(S) : Zhenmin Liang

It is certified that error appears in the above-indentified patent and that said Letters Patent is hereby corrected as shown below:

In the Drawings:
Fig. 2 has been deleted and substituted with the attached Fig. 2.

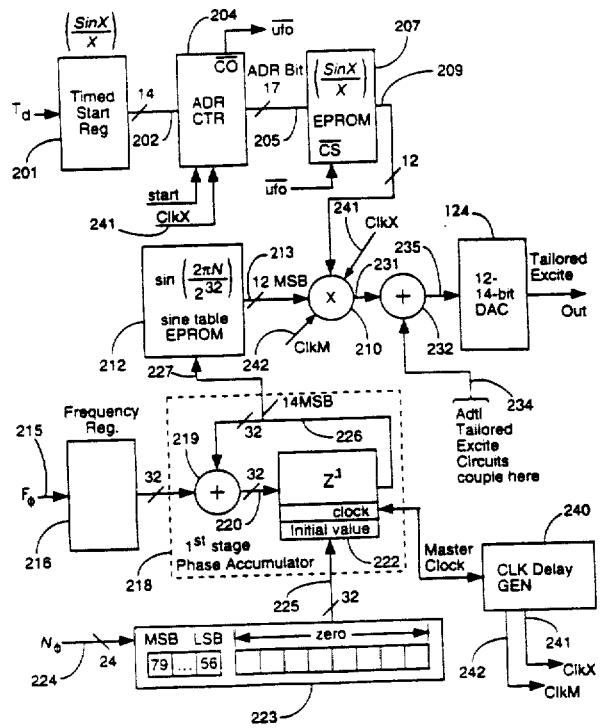

FIG. 2

UNITED STATES PATENT AND TRADEMARK OFFICE
CERTIFICATE OF CORRECTION

PATENT NO. : 5,248,882
DATED : September 28, 1993
INVENTOR(S) : Zhenmin Liang

It is certified that error appears in the above-indentified patent and that said Letters Patent is hereby corrected as shown below:

In column 7, line 6 --as:-- should be added after "expressed"

In column 13, line 34 "$t_{01},...,t_0$" should be --$t_{01},...,t_{0n}$--

In column 15, line 7 "$t_{01},...,t_0$" should be --$t_{01},...,t_{0n}$--

In column 15, line 68 "$t_0,...,t_{0n}$" should be --$t_{01},...,t_{0n}$--

In column 17, line 49 "claim 3" should be --claim 38--

Signed and Sealed this

Tenth Day of May, 1994

Attest:

BRUCE LEHMAN

Attesting Officer

Commissioner of Patents and Trademarks